July 30, 1968 R. S. PERLOFF 3,395,293
TWO-WAY RAMP GENERATOR
Filed Dec. 7, 1965

INVENTOR
RONALD S. PERLOFF

BY William G. Miller Jr
AGENT

United States Patent Office 3,395,293
Patented July 30, 1968

3,395,293
TWO-WAY RAMP GENERATOR
Ronald S. Perloff, Warrensville Heights, Ohio, assignor to Leeds & Northrup Company, Philadelphia, Pa., a corporation of Pennsylvania
Filed Dec. 7, 1965, Ser. No. 512,046
7 Claims. (Cl. 307—228)

ABSTRACT OF THE DISCLOSURE

A two-way ramp generator which develops a linear ramp voltage in one direction or another at an output terminal by charging a shunt capacitor at the output terminal from a first or second transistor current generator depending upon the relative potentials at the input and output. The input and output terminals are connected by oppositely poled diodes. One current generator provides a current of magnitude I toward the junction between the diodes while another current generator provides a current I/2 away from the output terminal.

---

This invention relates to a linear ramp generator circuit and particularly to a linear ramp generator circuit for producing a ramp form of potential output changing in a direction depending on the relative potential of the input as compared to the output potential of the circuit.

Most ramp generators such as those referred to as linear sweep generators are designed to produce a ramp form of potential output changing in one direction only and are therefore not satisfactory for use in certain types of circuit applications where a ramp form of potential output must be produced which is capable of being changed in one direction in response to a changing input potential in a particular direction whereas a ramp form of potential output must be produced in an opposite direction in response to an opposite direction of change of the input potential.

It is an object of this invention to provide an improved two-way ramp generator circuit.

A further object of this invention is to provide a two-way ramp generator circuit for producing a ramp form of potential output changing in direction dependent upon the relative potential of the input as compared with the output.

A further object of this invention is the provision of a simple and inexpensive two-way ramp generator which is capable of being adjusted to vary the slope of the ramp generated with the slope for each polarity being maintained equal.

In accordance with this invention, there is provided an input terminal for accepting a signal having a variable potential with respect to ground. This input terminal is connected by connecting means to an output terminal. The connecting means includes serially-connected oppositely-poled diodes. A first current source is connected between ground and a point on said connecting means which is intermediate between the diodes while a second current source, which provides a current of only one-half of the magnitude provided by the first current source, is connected between ground and the output terminal and is so arranged that the current flow with respect to the output terminal and its connecting means is opposite in direction to the current flow produced by the first current source with respect to its point of connection with said connecting means. A capacitor is also connected between ground and the output terminal to be selectively charged in one direction or the other from the first or second current source in dependence upon the relative potential between the potential that the input terminal has with respect to ground and that established by the capacitor at the output terminal with respect to ground.

A better understanding of the present invention may be obtained from the following description in connection with the drawings in which FIG. 1 is one form of a two-way ramp generator.

Figure 1:
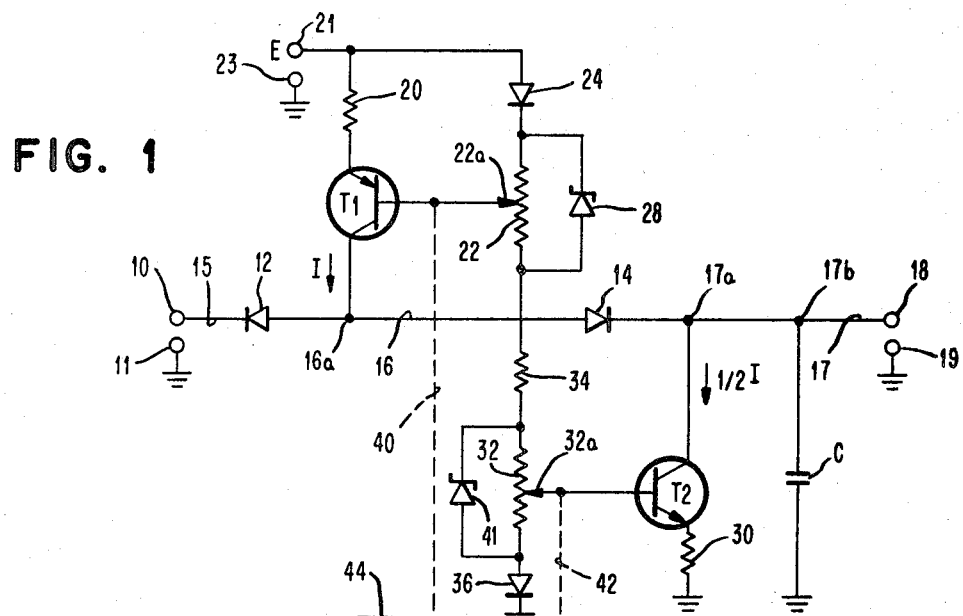

With reference to FIG. 1, the input terminal 10 is connected to receive a potential of varying magnitude and polarity with respect to a common or ground terminal 11. Input terminal, 10, is connected by way of a connecting means including a first diode 12 and a second diode 14 by the interconnecting wires 15, 16 and 17 to output terminal 18.

A first current source is connected between ground terminal 23 and means at a point 16a on connecting wire 16 intermediate between the diodes 12 and 14. This current source includes transistor $T_1$ and the associated circuitry. Transistor $T_1$ is a pnp transistor having its emitter connected to a source of potential E, between terminals 23 and 21, through a resistor 20 with its collector being connected directly to the connecting wire 16.

The base of transistor $T_1$ is connected to the movable contact 22a of potentiometer slidewire 22 so that the potential at the base of transistor $T_1$, as presented on the variable tap 22a, can be adjusted.

The potentiometer slidewire 22 is serially connected with diode 24 between terminal 21 of potential source E and a similar network including resistor 34, potentiometer slidewire 32 and diode 36 to ground so that the current can flow from the source E in a forward direction through diode 24 and through potentiometer slidewire 22 to establish the desired potential on the movable contact 22a of potentiometer slidewire 22. It will also be noted from FIG. 1 that the potentiometer slidewire 22 is shunted by Zener diode 28 which is provided as a means for simplifying calibration of the circuit and to make the circuit relatively insensitive to changes in the supply potential E.

With the connection of the transistor $T_1$ as above described, the voltage at the base of transistor $T_1$, as established by the potential drop across the upper portion of the slidewire 22 above the position of contact 22a and the drop across diode 24, will be equal to the voltage drop across resistor 20 plus the diode drop between the base and emitter of $T_1$. The voltage established across resistor 20 is in accordance with the emitter current. The collector current, that is the current from the transistor to the connecting wire 16, will be equal to $\alpha$ times the emitter current and since the value of $\alpha$ is very close to unity, the emitter current flows out of the collector regardless of the collector voltage. Thus, the transistor $T_1$ and the associated circuitry shown in FIG. 1 forms a current generator or current source. The current produced by the transistor $T_1$ as shown in FIG. 1 is a current "I" whose conventional direction is shown as being toward the connection point 16a of the collector of transistor $T_1$ to connecting wire 16.

$T_2$, which is an npn transistor, has its collector connected to the connecting wire 17 at a point 17a while its emitter is connected through resistor 30 to ground.

As described previously in connection with the first current source, the base of transistor $T_2$ is connected to a variable potential point, namely the movable contact 32a of potentiometer slidewire 32. Potentiometer slidewire 32 is connected in a series circuit with a resistor 34 which has one terminal connected to potentiometer slidewire 22, the other terminal being connected to poteniometer slidewire 32. The terminal of potentiometer slidewire 32 opposite that connected to resistor 34 is connected through diode 36 to ground. The diode 36 is poled so that current flow from the slidewire 22 to ground is through the diode in a forward direction.

The potentiometer slidewire 32 is shunted by Zener diode 41 which like Zener diode 28 is provided for purposes of simplifying calibration of the circuit and to make the circuit relatively insensitive to changes in the supply voltage E.

Since the voltage drop across diode 36 is approximately equal to that across the base to emitter junction of $T_2$, the voltage drop over the emitter resistor 30 is substantially equal to the voltage drop over the portion of potentiometer slidewire 32 between the tap 32a and the terminal connected to diode 36.

Since the collector currents in transistor $T_2$ will be substantially equal to the emitter current, α being close to unity, the transistor $T_2$ is a current source just as is transistor $T_1$. However, transistor $T_2$ is adjusted to be a current source providing a current of "½ I" with the conventional direction of current flow being that shown by the arrow, namely from point 17a of connecting wire 17 to ground by way of transistor $T_2$ and resistor 30.

As shown in FIG. 1, the movable contacts 22a and 32a of the respective potentiometer slidewires 22 and 32 are simultaneously adjusted by the mechanical couplings 40 and 42 by the adjusting knob 44. The adjustments are so arranged that the potentials established on the bases of $T_1$ and $T_2$ maintain the desired relationship between currents supplied by the first and second current source, namely that the current supplied by the first source "I" should be twices the value of that supplied by the second source, shown as "½ I" regardless of the particular value of the current. By the adjustment of knob 44 and the consequent adjustment of the current generated by the first and second current sources, it will be possible, as will be explained, to vary the slope of the ramp generated.

The diodes 24 and 36 not only provide potential drops equal to those across the base-emitter junctions of the associated transistors but also are included in the circuit of FIG. 1 for the purposes of temperature compensation. Such use of the diodes is known in the art and therefore requires no further explanation.

Capacitor C connected from point 17b on line 17 to ground is provided to establish a potential at the output terminal 18 with respect to ground terminal 19 and to allow that potential to vary in accordance with the rate at which the capacitor is charged or discharged by current from the first and second current source. Capacitor C may, of course, be a single capacitor or if desirable, it may be made up of a group of parallel connected capacitors. The term "charge" may, of course, be used to refer to a change in potential across the capacitor of either direction and therefore does not necessarily refer only to a change of a specific polarity across the capacitor C.

Figure 2:
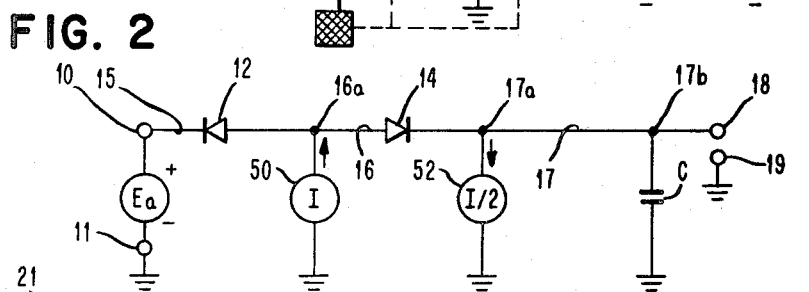
FIG. 2 is an equivalent circuit illustrating the operation of the two-way ramp generator.

The operation of the circuit of FIG. 1 is best illustrated by reference to FIG. 2 which is a diagram of an equivalent circuit of FIG. 1. In FIG. 2, the input termnial 10 is provided with a potential $E_a$ having its positive terminal connected to input terminal 10 and its negative terminal connected to ground terminal 11. The connecting means provided by connecting wire 15, diode 12, connecting wire 16, diode 14 and connecting wire 17 couple the input terminal 10 to the output terminal 18. As was the case in FIG. 1, the diodes 12 and 14 in FIG. 2 are oppositely poled in the serial connection between input terminal 10 and output terminal 18.

The first current source 50 provides a current "I" between ground and connecting wire 16 which the conventional direction of current flow being from ground to wire 16 as shown by the arrow. The connection point 16a of the first current source 50 is intermediate between the diodes 12 and 14 while the connection of the current source 52 which provides a current of "½ I" between ground and connecting wire 17 is made at point 17a. The second current source 52 is so arranged that the conventional current flow is in a direction from wire 17 toward ground.

As in FIG. 1, the capacitor C is connected between wire 17 and ground, effectively between the output terminal 18 and ground.

In operation of the circuit, when the potential $E_a$ exceeds the potential stored on capacitor C and established thereby at output terminal 18, the diode 12 is back-biased while the diode 14 is forward-biased so that the diode 12 blocks any current flow from input terminal 10 while diode 14 permits current flow from the first current source 50 through diode 14. One-half of the current flowing through diode 14 will be shunted through the second current source 52 while the other half will be conducted through wire 17 and capacitor C to charge C until the potential at output terminal 18 reaches a potential equal to $E_a$.

When the potential $E_a$ is equal to the potential at the output terminal 18 as established by the charge on capacitor C, both the diodes 12 and 14 are forward-biased and no charging of the capacitor C occurs. One-half of the current of source 50 flows to ground through $E_a$, and one-half through source 52 to ground. Therefore, the potential established on output terminal 18 with respect to ground terminal 19 is maintained unchanged.

When the source of potential $E_a$ establishes a potential at input terminal 10 which is less than the potential established at the output terminal 18 by the charge on capacitor C, then the diode 12 is forward-biased while diode 14 is back-biased. Diode 14 will then not conduct current from current source 50 to the capacitor C and the capacitor C wil be discharged by the current flow through current generator 52 so that the potential at output terminal 18 will decrease linearly at a rate dependent upon the magnitude of current flow through current source 52.

From the above description, it will be evident that a potential at the input terminal 10 above the potential at the ouput terminal 18 causes a linear ramp in an increasing direction at the output terminal 18 until the potential at the output terminal is equal to the potential at the input terminal where as a potential on input terminal 10 lower than that at 18 wil cause a linear ramp at the output terminal 18 in the opposite direction, namely in a decreasing direction until the potentials at the input and output terminals are equal. The circuit of FIG. 1 as illustrated by the equivalent circuit of FIG. 2 is thus a two-way ramp generator in that it is capable of generating a potential output having a ramp form in either a positive going or a negative going direction in dependence upon the relative magnitude of the potentials at the input terminal 10 and the potential established at the output terminal 18 by the charge on capacitor C.

To obtain very slow ramp functions, or in other words a potential having a ramp form with a small slope, it is necessary that the collector current of the first power source as well as the second power source should be low in value. Such low collector currents are readily obtained with an npn transistor; however, they are difficult to obtain with available pnp transistors. It is thus desirable to change the circuit of FIG. 1 in the manner as shown in FIG. 3 to provide for such slow ramps.

Figure 3:
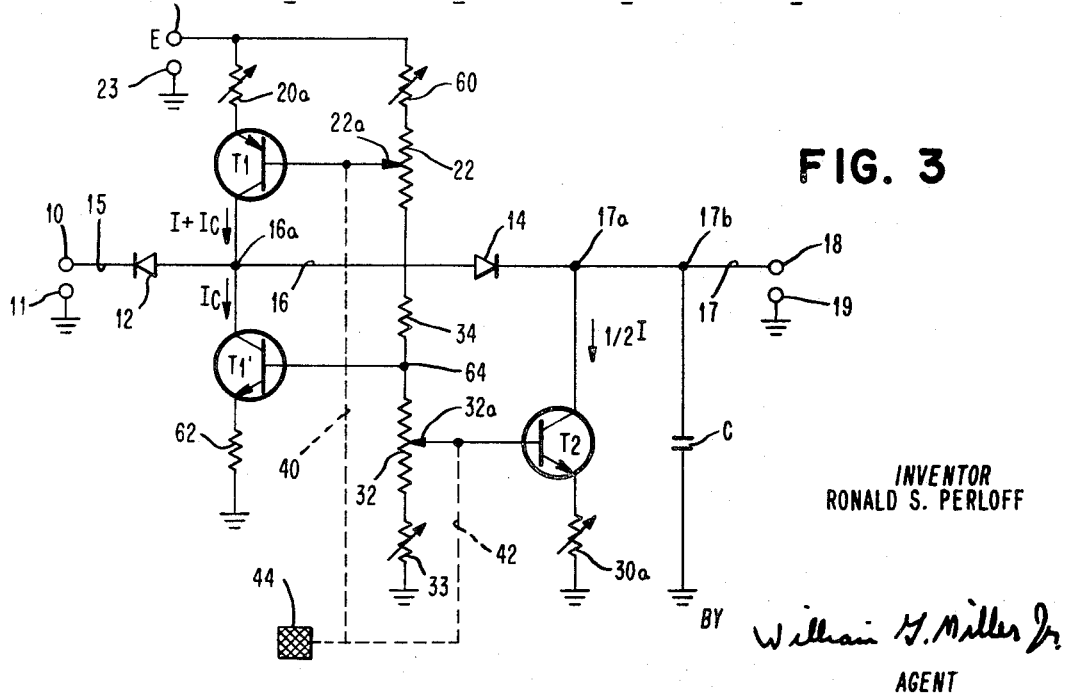
FIG. 3 is a modified form of the two-way ramp generator of FIG. 1.

It will be evident from FIG. 3 that the first current source, which in FIG. 1 included transistor $T_1$ includes in FIG. 3 not only transistor $T_1$ but also transistor $T_1'$. Transistor $T_1'$ is an npn transistor which is placed in the circuit so as to draw off a constant current from transistor $T_1$. Compensation for the drawing off of this constant current from transistor $T_1$ is obtained by the addition of the variable resistor 60 which is connected between terminal 21 of the source E and the potentiometer sidewire 22. Other changes which have been made in the circuit are the change of the resistors 20 and 30 to variable resistors and the addition of variable resistor 33 which perform a function similar to that of resistor 60 Resistors 20 and 30 of FIG. 1 are therefore noted in FIG. 3 as variable resistors 20a and 30a. In FIG. 3 they are made to be variable for purposes of calibration.

The transistor $T_1'$ is an npn type as previously mentioned and has its collector connected directly to connecting wire 16 at point 16a while its emitter is connected through resistor 62 to ground. The base of transistor $T_1'$ is connected to terminal 64 between resistor 34 and the upper terminal of potentiometer slidewire 32 so as to provide the desired potential for the base $T_1'$ to establish through that transistor the desired constant current which enables the transistor $T_1$ to work at a higher collector current and to therefore have improved performance. It will be observed by reference to FIG. 3 that the operation of the circuit of FIG. 3 is very similar to FIG. 1 with the exception that transistor $T_1$ supplies the current $I+I_c$ to the connecting wire 16, the transistor $T_1'$ forming a third current source draws the current $I_c$ from connecting wire 16. Thus, when the potential at input terminal 10 is greater than that maintained at output terminal 18 by the charge on capacitor C the current flow through forward-biased diode 14 will be the current $I$ as is the case in FIG. 1. One-half of that current will flow through the second current generator, $T_2$, and the other half of the current will flow through the capacitor causing the change in the charge on the capacitor to increase the potential of output terminal 18 linearly along a ramp whose slope will be determined by the setting of the movable contact 22a and 32a established by an adjustment of knot 44. Other than the above described operation, the circuit of FIG. 3 operates in the same manner as that described above for FIG. 1, the only difference being that FIG. 3 is adapted for producing ramps having a smaller slope.

In FIG. 3 there has been omitted the diodes 24 and 36 which are shown in FIG. 1 as well as the Zener diodes 28 and 41 shown in FIG. 1. Under certain circumstances, the compensation provided by diodes 24 and 36 is not necessary, and also where the voltage supply E is substantially constant the Zener diode 28 and 41 may also be dispensed with.

It will be evident to those skilled in the art that the directions of current flow in the several current sources and the polarity of the diodes may be reversed if desired.

What is claimed is:

1. A two-way ramp generator comprising
an input terminal for accepting a variable potential signal,
means connecting said input terminal to an output terminal, said means including serially-connected oppositely-poled diodes,
a first current source connected to said connecting means at a point on said connecting means intermediate between said diodes,
a second current source connected to said output terminal to provide a current one-half the magnitude of the current of said first source, the direction of current flow of said second source with respect to said connecting means being opposite in direction to the current flow of said first source with respect to said connecting means,
and a capacitor connected to said output terminal so that it is charged by a current equal to one-half the magnitude of the current of said first source until said output terminal reaches the potential of said input terminal to provide thereby a potential at said output terminal which is a substantially linear ramp function.

2. A two-way ramp generator as set forth in claim 1 in which said serially connected diodes include a first diode having its cathode connected to said input terminal and a second diode with its cathode connected to said output terminal.

3. A two-way ramp generator as set forth in claim 1 in which said first current source includes a pnp transistor, and said second source includes an npn transistor.

4. A two-way ramp generator as set forth in claim 3 in which the potential at the base of each of said transistors is variable simultaneously to adjust the magnitude of the current produced by said current sources while maintaining their relative relationship.

5. A two-way ramp generator as set forth in claim 3 in which said first current source also includes an npn transistor operable to drain a fixed amount of current from said first source to establish a desirable operating level for the pnp transistor of said first source.

6. A two-way ramp generator comprising
an input terminal for accepting a variable potential signal,
means connecting said input terminal to an output terminal, said means including serially-connected oppositely-poled diodes,
a first current source connected to said connecteed means at a point intermediate between said diodes, said first current source including a pnp transistor having its collector connected to said connecting means at said point and having means for establishing a current flow to said point equal to $I+I_c$, said first current source including an npn transistor having its collector connected to said connecting means at said point and having means for establishing a current flow from said point equal to $I_c$, a second current source connected to another point of said connecting means between said output terminal and one of said diodes, said second current source including an npn transistor having its collector connected to said other point for establishing a current flow from said point of a magnitude ½ $I$, and
a capacitor connected to said output terminal so that it will be charged by a current equal to ½ $I$ until said output terminal reaches the potential of said input terminal.

7. A two-way ramp generator as set forth in claim 6 in which
the pnp transistor of said first current source and the npn transistor of said second current source are biased by separate circuits which are adapted to be simultaneously adjusted so that the relationship of the currents in said first and second current sources is maintained as the value of said biases is adjusted to regulate the current in said sources to modify the slope of the rate of change of voltage at said output terminal.

References Cited

UNITED STATES PATENTS 2,868,972  1/1959  Smee _____ 328—181

ARTHUR GAUSS, *Primary Examiner.*

J. ZAZWORSKY, *Assistant Examiner.*